UNITED STATES PATENT OFFICE.

FRANK VREDENBURG, OF STERLING, COLORADO, ASSIGNOR OF ONE-THIRD TO GEORGE HALLMAN, OF SAME PLACE.

YEAST.

SPECIFICATION forming part of Letters Patent No. 587,771, dated August 10, 1897.

Application filed January 16, 1897. Serial No. 619,426. (No specimens.)

*To all whom it may concern:*

Be it known that I, FRANK VREDENBURG, a citizen of the United States of America, residing at Sterling, in the county of Logan and State of Colorado, have invented certain new and useful Improvements in Ferments or Yeasts; and I do hereby declare the following to be a full, clear, and exact description of the invention, such as will enable others skilled in the art to which it appertains to make and use the same.

This invention relates to the manufacture of yeasts or ferments; and it consists in the use of a particular variety of the sage-plant in lieu of hops in the manufacture of yeast and yeast-cakes and for other purposes—for instance, as a substitute for hops in the making of beer. After a series of experiments I have discovered that the "Rocky Mountain wild-sage plant," a species of sage locally known by such name and botanically as *Artemisia tridentata*, which plant grows and occupies a vast extent of the desert land in the neighborhood of the Rocky Mountains and is abundant in Colorado, is a cheaper and superior ingredient in ferments and yeast than hops and may be used advantageously as a substitute therefor.

One manner of preparing yeast-cakes is to take one ounce of the wild-sage plant and steep the same in two quarts of boiling water for five minutes, then add to the decoction one-half pound of wheat-flour, which is stirred in until a smooth paste is formed, to which I add a tablespoonful of salt, one of ginger, and one-fourth ($\frac{1}{4}$) of a cup of sugar. To the foregoing, when the same is slightly warm, add one cupful of yeast and let stand for forty-eight hours, when the ferment may be used, but I prefer to add thereto a sufficient quantity of cornmeal made from white corn to thicken the ferment, so that it can be made into cakes, which when dry may be used in the usual manner.

Yeast when made with the sage-plant treated as above set forth has all properties as yeast made with hops. Liquid yeast or yeast-powders may also be made after the usual manner, using the wild-sage plant hereinbefore mentioned instead of hops.

In the manufacture of beer the plant is treated and used in the same manner as is customary with hops of commerce.

I am aware that prior to my invention other plants, such as the herb known botanically as *Gnaphalium polycephalum*, have been used in yeast.

What I claim, and desire to secure by Letters Patent of the United States, is—

1. The herein-described yeast or ferment, containing yeast and a suitable vehicle, and an extract made from the Rocky Mountain wild sage, as set forth.

2. As an improved article of manufacture, a ferment or yeast, with which is incorporated in lieu of hops, an extract made from the Rocky Mountain wild-sage plant (*Artemisia tridentata*) for the purpose set forth.

3. The ferment or yeast consisting of flour, sugar, yeast, and an extract of the plant, known botanically as *Artemisia tridentata*, substantially as set forth.

4. As an improved article of manufacture, a ferment or yeast consisting of an extract of the Rocky Mountain wild-sage plant, meal, flour, sugar, salt, and yeast, substantially as set forth.

5. As an improved article of manufacture, a ferment or yeast consisting of a decoction or extract of the Rocky Mountain wild-sage plant, wheat-flour, salt, ginger, sugar, yeast, and cornmeal, substantially as set forth.

In testimony whereof I affix my signature in presence of two witnesses.

FRANK VREDENBURG.

Witnesses:
S. A. BURKE,
GEORGE HALLMAN.